Patented Oct. 23, 1951

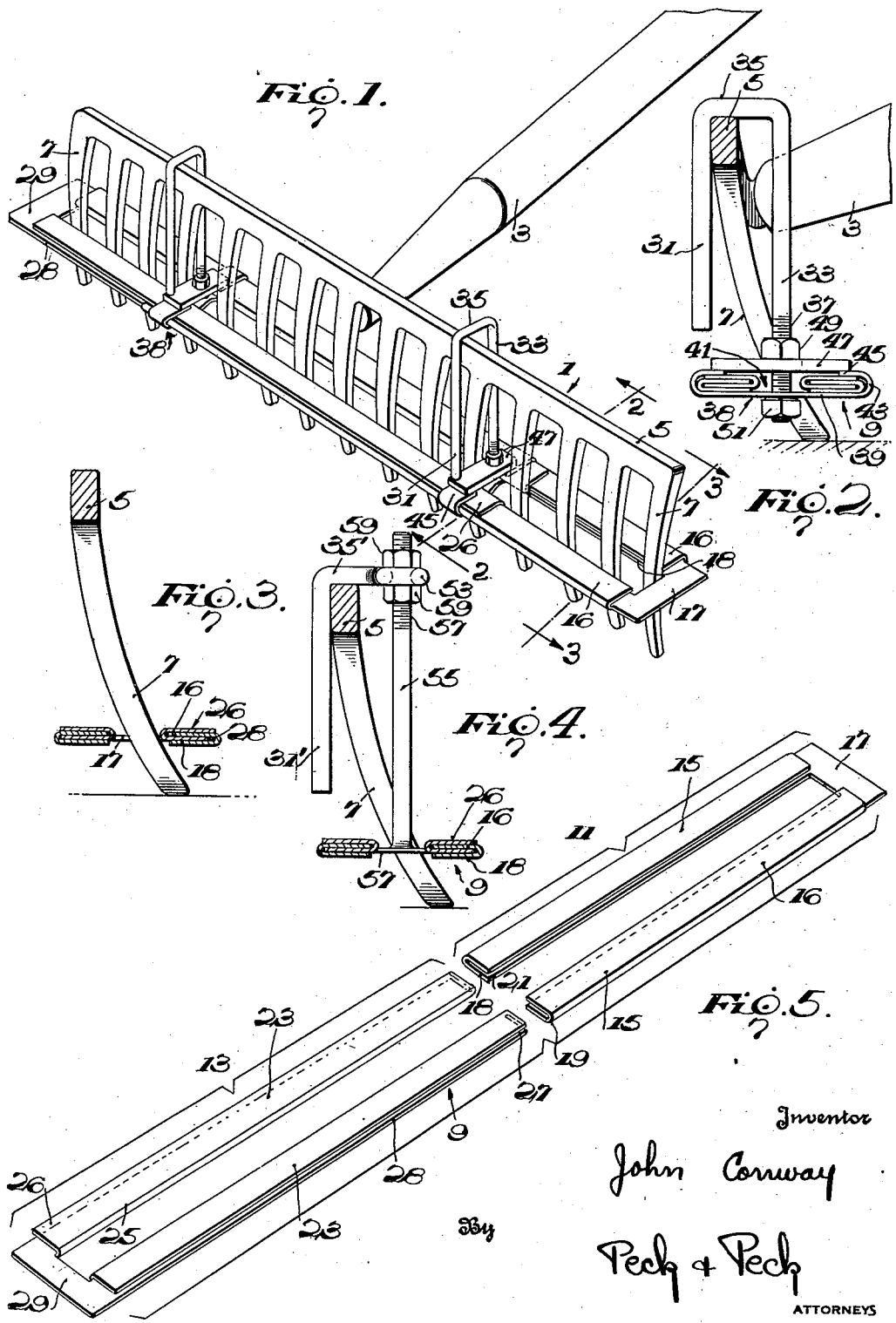

2,572,247

UNITED STATES PATENT OFFICE 2,572,247

RAKE CLEANER ATTACHMENT

John Conway, Minneapolis, Minn.

Application December 2, 1948, Serial No. 63,118

1 Claim. (Cl. 56—400.08)

This invention relates broadly to rake cleaners, and in its more specific aspects it relates to a rake cleaner loosely mounted on a rake, such as the conventional garden rake, requiring no mechanical parts for its operation; and the nature and objects of the invention will be readily recognized and understood by those skilled in the arts to which it relates in the light of the following explanation and detailed description of the accompanying drawings illustrating what I at present believe to be the preferred embodiments and mechanical expressions of my invention from among various other forms, arrangements, combinations and constructions, of which the invention is capable within the spirit and scope thereof.

It is highly desirable to provide a rake cleaner for operation on the tines of a rake which does not require levers, push bars or any other mechanical means to cause operation of the cleaning element or elements. I am aware that cleaners are known which do not require mechanical operating means. However, such prior devices are objectionable for various reasons and therefore have not been widely accepted. For instance, it is advantageous to provide a rake cleaner which is loosely mounted on, and hung from the top bar of a rake with means for removal, which does not require unhooking the hanger from the top bar while the cleaner elements are combined in operative relative positions. Certain cleaners which are now known may be removed from the rake as a unit by merely unhooking the hanger element from the top bar of the rake. Cleaners of the general type of my invention which are constructed for removal as a unit from the rake are unsatisfactory by virtue of the fact that they may become inadvertently unhooked from the rake during a raking operation. I have overcome this objectionable characteristic of former rake cleaners by so constructing my device that it is not removable as a unit from the rake, but certain of the elements thereof must be detached or separated for removal of the cleaner.

Certain rake cleaners of this general type must be subjected to bending in order to attach the cleaner to or detach it from a rake. This is obviously objectionable, for the metal, if bent too often or too sharply, will crystallize and snap. Furthermore, it will be recognized that it is very unlikely that the bent elements will be returned to their proper shapes and relative positions when the bending operation is completed, and thus the proper operation of the cleaner may be greatly impaired.

It is therefore one of the objects of my invention to provide a rake cleaner involving no mechanical operating means.

A further object of my invention resides in the construction of a rake cleaner which is loosely hung on a rake but which cannot be inadvertently detached or removed from the rake during a raking operation.

Another characteristic of my invention resides in the provision of a rake cleaner which may only be removed from the rake following detachment of certain of the elements of the cleaner from each other.

It is also an object of my invention to provide a rake cleaner which may be attached to or detached from a rake without bending or otherwise distorting any of the elements of the cleaner.

Conventional rakes are produced in four sizes having 8, 14, 15, and 16 teeth or tines, and it is therefore desirable to produce a rake cleaner which will fit any standard size of rake. I have devised a rake cleaner embodying adjustable features so that it may be used on rakes of any standard size. However, the adjustable rake cleaner of this invention is designed to greatly facilitate and expedite the adjusting operation since there are no special openings which receive the teeth of the rake and therefore no specific positioning of each tooth relative to the cleaner is required when the rake cleaner is adjusted for operation on a particular rake.

Another feature of my invention resides in the provision of adjusting means whereby the length of the operative stroke of the cleaner on the rake may be regulated.

A further object of my invention is to provide an accessible and easily operable mechanism whereby the operative stroke of the cleaner may be regulated.

It is also an object of my invention to provide weight means for improving operation of the cleaner which also functions as the adjusting means, as well as the attaching and detaching means, for the stroke of the cleaner.

And yet another object of my invention is to provide a rake cleaner of sturdy construction which will withstand hard usage and is economical to manufacture.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings:

Fig. 1 of the drawings is a view in perspective of the rake cleaner of this invention mounted in operative position on a rake.

Fig. 2 of the drawings is an enlarged vertical section through the rake and cleaner taken on line 2—2 of Fig. 1.

Fig. 3 of the drawings is an enlarged view in vertical section taken on line 3—3 of Fig. 1.

Fig. 4 of the drawings is an enlarged view in vertical section of a modified form of my invention.

Fig. 5 of the drawings is a perspective view of the cleaner frame elements in separated positions prior to being attached to the hanger elements.

Referring to the accompanying drawings wherein I have used the numeral 1 to designate a conventional garden rake or the like having a handle 3 and main longitudinal top bar 5 from which the usual substantially rigid teeth or tines 7 depend. While I have illustrated in the drawings the application of my rake cleaner to a rake having 15 teeth, it is to be understood that this disclosure is merely one example of a type of rake to which the cleaner may be applied. The cleaner of this invention has been designed for application to many rakes of conventional sizes and as will be made clear hereinafter, is adapted for rapid and easy mounting on rakes having different numbers of teeth.

Referring particularly to Fig. 5 of the drawings wherein I have illustrated one form of cleaner frame which I have used the numeral 9 to designate in its entirety, it will be seen that such frame includes two separable parts 11 and 13. The cleaner frame element 11 includes a pair of transversely spaced longitudinally extending cleaner bars or strap members 15 connected together at one end by a transverse strap or bar 17. Each of these longitudinally extending cleaner bars or straps 15 are formed of metallic elements which are longitudinally folded to provide outside folds 19, the upper and lower folds 16 and 18, respectively, of the bars being spaced apart and the opening 21 between the upper and lower folds being inwardly directed so that oppositely disposed slots are provided by the openings. The other part 13 of the cleaner frame also comprises a pair of folded cleaner bars or straps 23, however, the fold 25 in the cleaner bars 23 extends along the inner edges of the bars and the opening or slot 27 on each bar between upper fold 26 and lower fold 28, is outwardly directed. The longitudinally extending cleaner bars or straps 23 are connected at one end by a transverse strap or bar 29.

The cleaner frame parts 11 and 13 are attachable together by telescoping the elements 13 into the elements 15 as will be particularly apparent by consideration of Fig. 1 of the drawings. The pockets which are formed between the folds of the straps provide guideways so that the relative positions of the parts 11 and 13 may be adjusted by sliding the folds in the pockets.

The cleaner frame 9 is so constructed that an entirely free and unobstructed area extends between the longitudinally extending bars or straps 15 and 23 for the entire length thereof. When the cleaner frame parts 11 and 13 have been telescoped together in proper relative positions to provide a cleaner frame of a length necessary to fit the particular rake to which it is to be applied, the cleaner frame is in readiness for attachment to the hanger mechanism which supports the cleaner frame from the rake.

The cleaner frame is operatively associated with and supported from the main top bar 5 of a rake by means of a pair of hanger straps or hooks. While I have disclosed two of such hooks it will be appreciated that more than two of such hooks may be used without departing from the spirit and scope of my invention. Each hook includes what I shall term a forward hooking leg 31 and a rear hanger leg 33, the two legs being connected by a horizontal web or the like 35. Each hanger element or hook is adapted to support the cleaner frame from the main top bar 5 of the rake, the connecting or supporting web 35 resting upon and being supported by the rake top bar when the hook is mounted on the rake in operative position. The two legs 31 and 33 of each hook depend from the web 35 and are substantially parallel to each other, the hanger leg 33 being longer than the forward leg 31 of the hook.

Each hanger leg 33 of each hook is adapted to removably and adjustably support the cleaner frame 9 on the lower end thereof for movement of the cleaner frame with the supporting hook in operative rake cleaning strokes or movements on the rake all as will be hereinafter described.

The lower end of each hanger leg 33 is threaded as at 37 for removably and adjustably supporting the cleaner frame for movement thereof with the hooks in operative strokes along the tines of the rake for removing debris which may be stuck thereon or therebetween. The cleaner frame is removably attached to the hanger leg 33 of each supporting hook by being positioned so that the lower ends of each hanger leg of the hooks projects through and between the longitudinally extending straps 15 and 23 of the cleaner frame. With the cleaner frame so positioned relative to the hanger legs 33 a clamping strap designated in its entirety by the numeral 38 and having a transverse web or body 39 provided with an opening 41 therein for loosely receiving the lower end of the hanger leg therethrough is applied to the lower sides of the cleaner frame. It will be understood that one of these clamping members or straps is provided for each hook, and each of such clamping members 38 is provided at each end of the web or body 39 with upwardly bent or turned hooks 43 which are inwardly bent to provide inwardly directed noses 45 which extend a distance inwardly over the upper surface of the cleaner frame and are bent downwardly thereagainst. The clamping bars or strap members having the bodies 39 may be applied in position with the lower end of each hanger leg 33 extending through the opening 41 whereupon the extending ends of the web are upwardly bent around the cleaner frame to provide the bends 43 and the noses 45. The clamping and supporting device also includes a complementary body 47 of relatively thick metal which bridges and extends across the area between the longitudinally extending bars or straps 15 and 23 of the cleaner frame and rests above the bars bearing on and against the noses 45 of the clamping strap. The bridging body 47 is provided with an aperture or opening for receiving therethrough the lower end of the hanger leg 33. An upper clamping and adjusting nut 49 is threaded on the hanger leg 33 in position thereon above the bridging member 47 while a lower clamping and adjusting nut 51 is threaded on the lower end of the hanger leg 33 in position thereon below the web 39 of the clamping member. With the various parts in the positions described the cleaner frame is fastened to the hanger leg 33 of each hook by tightening the nuts 49 and 51, the former being tightened and clamped against the bridging member 47 and the latter being tightened and clamped against the web 39 of the clamping member so that the cleaner frame is tightly clamped between the clamping member and the bridging member and thereby attached to the hanger leg 33 of the hook. It will be appreciated that the vertical position of the cleaner frame on the hanger leg 33 and thus on the rake may be adjusted to higher positions by loosening the upper nut 49 and adjusting the nut 51 to move the frame upwardly into desired vertical position relative to the hanger leg, and when such position is reached it may be maintained by again tightening the nut 49 into clamping position bearing against the bridging member 47, and by loosening nut 51 the position of the cleaner frame on the rake may be lowered.

With the hook or supporting hangers in position spacedly mounted on the rake so that the connecting webs 35 rest on and are supported by the main top bar 5 of the rake, and with the cleaner frame clamped to the hanger legs 33 as described, it will be evident that the teeth or tines of the rake extend between the longitudinally extending spaced straps of the cleaner frame and it will be further appreciated that the entire rake cleaner is loosely mounted and supported on the rake so that the hooks or hanger members and cleaner the frame which is associated therewith may move vertically up and down the teeth of the rake. When the rake is being used with the cleaner frame thereon, the frame will be at its lowest position when the rake is being normally operated, and in this position will tend to keep debris from becoming stuck on or between the teeth, however by shaking the rake the supporting hooks and associated cleaner frame will freely move up and down on the teeth of the rake and such operating strokes of the cleaner frame will remove all collected debris. The utilization of a relatively thick and heavy metal bridging member 47 adds weight to the entire assembly, which is advantageous in maintaining the cleaner frame in its lowermost position during normal raking operations and also adds force to the cleaning strokes when the rake is shaken to cause the cleaner frame to dislodge collected debris from the teeth of the rake.

One of the characteristics of my rake cleaner resides in the construction thereof whereby it is impossible for the cleaner and its supporting members to inadvertently become removed from the rake during either a raking operation or a shaking operation. This is due to the fact that the forward leg 31 of the hook is of such a length that the space between the lower end of the leg 31 and the upper end of the bridging member 47 is less than the depth or width of the bar 5 of the rake. Thus, when the cleaner frame and associated elements are in their highest position due to shaking or turning over of the rake, or for any other reason, the bridging member 47 will engage the lower edge of the top main bar 5 of the rake, and with the assembly in this position the lower end of the forward leg 31 of the support hook will not be above the upper surface of the top bar 5 so that the leg 31 cannot slip over the bar to disengage the entire assembly from the rake.

In various raking operations depending upon the debris being raked it may be desirable to adjust the vertical position of the cleaner frame relative to the rake and, as I have hereinabove pointed out, this may be accomplished by adjusting the nuts 49 and 51 on the hanger leg 33 to thereby vary the relative position of the cleaner frame relative to the hanger leg of the rake. By constructing the clamping member including the web 39 with the end hooks 45, it will be realized that this construction will maintain the separable parts 11 and 13 of the cleaner frame in proper positions and will not permit lateral displacement of any of the elements of the assembly.

One of the highly advantageous features of my rake cleaner resides in the arrangement whereby the length of the cleaner frame may be adjusted without particular attention being paid to the position of the teeth of the rake relative to the cleaner frame. This results from the particular construction whereby there are no transverse members extending between the longitudinally extending straps of the frame other than the transverse end members and therefore the user of the apparatus in adjusting it to rakes of various sizes need not be concerned with the position of the teeth of the rake, for in this device there are no slots, or separated openings into which the teeth of the rake must fit.

The only way the assembly may be removed from the rake is by removing the lower nuts 51 from the hanger legs to enable the clamping bars 39 to be removed from the hanger bars for subsequent removal of the cleaner frame. Thus the supporting hooks are not bent or distorted in either attaching or detaching the assembly to a rake and the original relative positions of legs 31 and 33 are maintained during the entire life of the cleaner.

In Fig. 4 of the drawings I have illustrated a modified form of my invention and in this figure of the drawings I have used the same reference numerals as heretofore used to designate similar parts. In this form of my invention, the forward leg 31' of each hook extends in substantially the same position relative to the rake as does the leg 31' in the preferred form of the invention, and the connecting web 35' of each hook is adapted to support the cleaner frame by resting on the top bar 5 of the rake, however the rear end of each connecting web 35' is formed to provide an eye member 53 through which the upper end of the hanger leg 55 is adapted to extend, the upper end of the hanger leg being threaded as at 57. Each hanger leg 55 is removably and adjustably positioned in an eye 53 by means of a pair of nuts 59 which are threaded on each hanger leg on opposite sides of the eye 53. Thus, by tightening the nuts 59 against the eye 53 the hanger leg is mounted and supported in adjusted position through the eye 53.

The lower end of each hanger leg 55 is provided with a foot 57 which is welded, soldered or otherwise attached to the cleaner frame 9.

In order to remove the cleaner of Fig. 4 of the drawings from a rake it is merely necessary to remove the nuts 59 from each hanger leg 55 whereupon the hanger legs 55 and the associated cleaner frame may be removed as a unit from the eye of the supporting hook.

I claim:

A cleaning device for a rake, comprising a cleaner frame including spaced cleaner bars, a hook having a web and at least one leg depending therefrom, said web adapted to rest on and be supported by the rake, and means removably and adjustably mounting the cleaner frame on the leg of the hook, including bridging and clamping members extending from one cleaner bar to the other on opposite sides thereof and having openings therethrough for loosely receiving the leg of the hook therethrough, said clamping member having bent end portions extending to the opposite sides of the cleaner bars and between said bridging member and the cleaner bars, and means threaded on the leg of the hook for maintaining said clamping and bridging members under pressure clamping the cleaner bars therebetween.

JOHN CONWAY.

REFERENCES CITED

The following references are of record in the file of this patent:

UNITED STATES PATENTS

| Number | Name | Date |
|---|---|---|
| 394,521 | Thorp | Dec. 11, 1888 |
| 416,763 | Thompson | Dec. 10, 1889 |
| 870,227 | Cronk | Nov. 5, 1907 |
| 974,268 | Hess | Nov. 1, 1910 |
| 1,208,855 | Stoffel | Dec. 19, 1916 |
| 1,264,750 | Bacho | Apr. 30, 1918 |
| 1,502,685 | Sarfaty | July 29, 1924 |
| 1,936,800 | Moork | Nov. 28, 1933 |
| 1,958,757 | Klingler | May 15, 1934 |
| 1,965,663 | McGrath | July 10, 1934 |
| 2,183,278 | Kelly | Dec. 12, 1939 |